(12) United States Patent
Parthuisot et al.

(10) Patent No.: US 7,614,973 B2
(45) Date of Patent: Nov. 10, 2009

(54) INFINITELY-VARIABLE TRANSMISSION WITH DOUBLE MODE POWER TRANSMISSION CONTROLLED BY A SLIDING DOG FOR A MOTOR VEHICLE

(75) Inventors: Jean-Pierre Parthuisot, Nanterre (FR); Robert Casenaz, Eragny sur Oise (FR)

(73) Assignee: Renault S.A.S., Boulogne Billancourt (FR)

( * ) Notice: Subject to any disclaimer, the term of this patent is extended or adjusted under 35 U.S.C. 154(b) by 331 days.

(21) Appl. No.: 11/597,363

(22) PCT Filed: May 23, 2005

(86) PCT No.: PCT/FR2005/050349
§ 371 (c)(1),
(2), (4) Date: Jan. 25, 2007

(87) PCT Pub. No.: WO2005/119101
PCT Pub. Date: Dec. 15, 2005

(65) Prior Publication Data
US 2007/0240962 A1    Oct. 18, 2007

(30) Foreign Application Priority Data
May 26, 2004    (FR) .................................. 04 05686

(51) Int. Cl.
*F16H 3/72*    (2006.01)
*F16H 3/44*    (2006.01)

(52) U.S. Cl. ............................ 475/5; 475/280; 475/284; 475/303

(58) Field of Classification Search .................... 475/5, 475/275–290, 303, 271
See application file for complete search history.

(56) References Cited

U.S. PATENT DOCUMENTS

| | | | |
|---|---|---|---|
| 3,866,490 A | | 2/1975 | Orshansky Jr. |
| 5,006,100 A | | 4/1991 | Brandt et al. |
| 5,890,988 A | * | 4/1999 | Kasuya et al. .............. 475/282 |
| 5,935,035 A | | 8/1999 | Schmidt |
| 6,514,167 B1 | * | 2/2003 | Fleytman et al. ............ 475/201 |
| 6,540,631 B2 | * | 4/2003 | Holmes ......................... 475/5 |
| 6,945,894 B2 | * | 9/2005 | Holmes ......................... 475/5 |
| 7,011,596 B2 | * | 3/2006 | Haka ........................... 475/285 |
| 7,011,597 B2 | * | 3/2006 | Haka ........................... 475/303 |
| 7,291,087 B2 | * | 11/2007 | Haka et al. ................... 475/303 |
| 2007/0221432 A1 | * | 9/2007 | Fournier et al. ............. 180/337 |

FOREIGN PATENT DOCUMENTS

| | | |
|---|---|---|
| FR | 2 847 014 | 5/2004 |
| GB | 1 172 982 | 12/1969 |

* cited by examiner

*Primary Examiner*—Roger Pang
(74) *Attorney, Agent, or Firm*—Oblon, Spivak, McClelland, Maier & Neustadt, L.L.P.

(57) ABSTRACT

An infinitely-variable transmission with double mode power transmission for a motor vehicle, provided with a combustion engine, including a first power transmission path with a composite epicyclic gear train connecting the combustion engine to the vehicle wheels, a second power transmission path with a simple epicyclic gear train, two electric motors providing a continuous speed variator, a second simple epicyclic gear train for mode change, and an engagement/disengagement unit that can block or release a mode-changing body in the second epicyclic gear train, according to the operating mode. The engagement/disengagement body includes a sliding sleeve with a dog tooth, which can be displaced by a hydraulic actuator and with two sets of dog teeth fixed to a mode-changing body in the second epicyclic gear train.

11 Claims, 3 Drawing Sheets

INFINITELY-VARIABLE TRANSMISSION WITH DOUBLE MODE POWER TRANSMISSION CONTROLLED BY A SLIDING DOG FOR A MOTOR VEHICLE

BACKGROUND OF THE INVENTION

The present invention relates to an infinitely variable transmission with two-mode power branching, for a motor vehicle equipped with a combustion engine.

FIELD OF THE INVENTION

With this kind of power branching transmission it is possible to obtain continuous variation from a reverse ratio to a forward ratio, passing through a special position called the "neutral engaged" position, in which the speed of the vehicle is zero, at any speed of the combustion engine.

DESCRIPTION OF RELATED ART

Power branching transmissions are of several types.

In a first type known as "input coupled", the transmission includes a pair of power branching pinions which take power from the input of the mechanism and a "combining" epicyclic gear train which combines the powers at the output of the mechanism. The transmission also includes a speed controller.

In another type, called "output coupled", the transmission includes a power-dividing epicyclic gear train at the input of the mechanism and a pair of power-combining pinions at the output of the mechanism. The transmission also includes a speed controller.

Finally, there are also known power-branching transmissions called "two matching point" transmissions, in which a first power-dividing epicyclic gear train is placed at the input of the transmission, while a second power-combining epicyclic gear train is fitted at the output of the transmission.

In this case also, the transmission includes a speed controller.

An infinitely variable transmission (IVT) uses only one or two of these three operating principles.

Clearly, it is useful to have two operating modes available for a single transmission, since this makes it possible to increase the range of transmission ratios and also makes it possible to decrease the dimensions of the speed controller device which can comprise electrical machines.

However, such two-mode transmission architectures, of the known type, have the disadvantage that the mode changes are carried out by multi-disk clutches positioned at the output of the transmission, in such a way that their operation is accompanied by abrupt changes of torque which cause disagreeable sensations for the users. Another disadvantage of such a transmission, described for example in U.S. Pat. No. 5,558,589 and U.S. Pat. No. 5,935,035, consists in the complexity of the architecture, due in particular to the presence of at least two clutches and one brake.

In a preceding French patent application FR 02 14 241 in the name of the present applicant, there is a description of an infinitely variable transmission with two operating modes, of the type having an electrical speed controller and at least two power branching paths, of which a main path links the combustion engine to the driving wheels, and a secondary path is connected to the electrical speed controller, in such a way that at least two operating modes can be used in the power branching path of the electrical speed controller.

The infinitely variable transmission described in this prior patent application comprises a first compound epicyclic gear train which enables the combustion engine to be linked to the wheels of the vehicle along a main power branching path and a simple epicyclic gear train which enables the power branching to be carried out, together with a second compound epicyclic gear train, thus forming a system for changing modes between at least two operating modes of the infinitely variable transmission.

The transmission described in this prior patent application comprises two engagement/disengagement devices which enable two shafts of the transmission to be independently locked or released with respect to rotation, thus providing one of the operating modes of the transmission on each occasion.

When there is a change of mode, the two engagement/disengagement devices are driven independently by two actuators which can be moved by an electrical force or a hydraulic force. The two actuators are operated in such a way that the two modes are engaged simultaneously, the aforesaid two shafts of the transmission being simultaneously locked with respect to rotation.

In a practical embodiment of this transmission, the mode change operation is carried out by means of multi-disk hydraulic brakes. This requires a relatively complex hydraulic circuit to provide a suitable supply to the two hydraulic brakes whose bulkiness is an additional drawback. Moreover, the energy consumption required for actuating the linings of the brakes used and for keeping them in the locked position causes a decrease in the efficiency of the transmission. The same applies to the frictional torque of the brakes in the open position.

Finally, if the hydraulic supply circuit fails, the two brakes are automatically set to the open position. In this case, the transmission is said to be "open" and certain operations, such as the starting of the combustion engine of the vehicle, by one of the two electrical machines, cannot be carried out.

SUMMARY OF THE INVENTION

The present invention relates to an infinitely variable transmission using two distinct operating modes and including a mode changing device for changing from a first operating mode to a second operating mode.

The object of the present invention is an infinitely variable transmission with two operating modes which overcomes these drawbacks.

Another object of the present invention is a transmission of this kind in which the efficiency of the transmission is improved.

Another object of the present invention is a transmission of this kind in which each operating mode is kept stable even if there is a failure of the supply to the means of driving the mode change device.

Another object of the present invention is to simplify the transmission architecture so as to reduce its overall dimensions and its production cost.

Another object of the present invention is an infinitely variable transmission with two operating modes in which the switch between the two operating modes is carried out in a particularly simple way.

The infinitely variable transmission with power branching and two operating modes according to the invention, for a motor vehicle equipped with a combustion engine, is of the type comprising a first main power branching path with a compound epicyclic gear train linking the combustion engine to the wheels of the vehicle, a second power branching path with a first simple epicyclic gear train, two electrical machines forming a continuous speed controller and a second simple epicyclic gear train for mode changing, together with an engagement/disengagement unit capable of locking or releasing a member of the second epicyclic gear train for mode changing, according to the operating mode.

The engagement/disengagement unit comprises a sliding sleeve provided with dog toothing which can be displaced by a hydraulic actuator and two sets of dog teeth, each fixed to a member of the second epicyclic gear train for mode changing.

The control of such a sliding sleeve is particularly easy to implement, and this simplifies the construction of the transmission. Moreover, the efficiency of the transmission is improved, since the power is transmitted by the dog teeth without any risk of relative slipping and without the need to apply a permanent force to the brake disks.

The hydraulic actuator can comprise a piston and two hydraulic feed chambers located one on each side of the active part of the piston.

The piston can be connected to the sliding sleeve, for example, by means of a spring washer.

In an advantageous embodiment, the hydraulic actuator is located axially on only one side of the sliding sleeve, making the structure more compact.

As a general rule, the sliding sleeve can occupy two positions, in each of which the dog toothing of the sliding sleeve engages with only one set of dog teeth of a member of the second epicyclic gear train for mode changing. Thus the transmission is in one or other of its modes, according to the position of the sliding sleeve.

Preferably, in a first position of the sliding sleeve, the dog toothing of the sliding sleeve is in engagement with the toothing of the sun gear of the second epicyclic gear train for mode changing, and in a second position the sliding sleeve dog toothing is in engagement with the planet carrier of the second epicyclic gear train for mode changing.

In all cases, the dog toothing of the sliding sleeve is such that it is in engagement with the two sets of dog teeth each of which is fixed to the members of the mode changing gear train during the change between its two positions. For example, it is acceptable for the axial length of the dog toothing of the sliding sleeve to be chosen so that it enters into engagement with one set of teeth while it is still in engagement with the other set of teeth. Thus the two members of the mode changing gear train are fixed with respect to rotation by the sliding sleeve during mode changes.

A retaining device with balls and springs can interact with the sliding sleeve to retain it in position in each of its two positions.

Thus, in all cases, the sliding sleeve remains in position, with an engaged mode, if, for example, the oil supply to the hydraulic actuator is defective or insufficient; this creates a safety factor for the use of the transmission.

The hydraulic feed chambers can be sealed by joints of different types, for example sealing rings or lip seals.

BRIEF DESCRIPTION OF THE DRAWING(S)

The invention will be more clearly understood from a study of a specific embodiment provided by way of example and without any restrictive intent and illustrated by the attached drawings, in which.

DETAILED DESCRIPTION OF THE PREFERRED EMBODIMENTS

Figure 1:
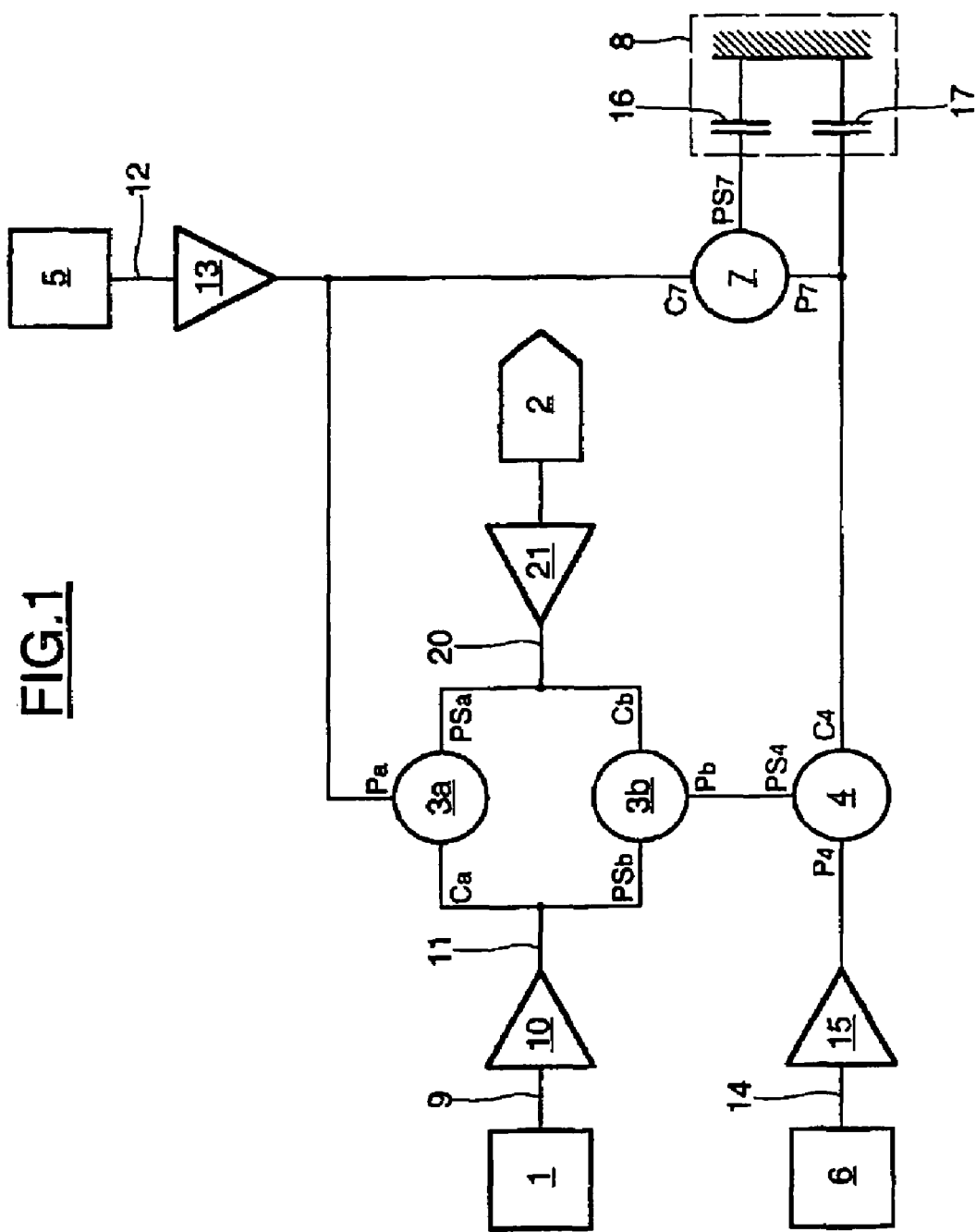
FIG. 1 shows schematically the main functional elements of an infinitely variable transmission according to the invention.

As shown in the functional diagram of FIG. 1, the infinitely variable transmission is fitted between a combustion engine 1 which constitutes a power unit of a motor vehicle and the axle 2 of the driving wheels of the vehicle which constitutes the driven element. The transmission comprises a first main power branching path with a compound epicyclic gear train 3a, 3b. The ring gear Ca of the gear train 3a is fixed to the planet carrier PSb of the gear train 3b. Similarly, the ring gear Cb of the gear train 3b is fixed to the planet carrier PSa of the gear train 3a.

A second power branching path comprises a first simple epicyclic gear train indicated by 4. Two electrical machines, indicated by 5 and 6 respectively, constitute a continuous speed controller. Finally, a second simple epicyclic gear train indicated by 7, acting as a mode changing device, is associated with an engagement/disengagement unit 8 and completes the essential structure of the transmission.

The power supplied on the output shaft 9 of the combustion engine 1 passes through a reduction unit 10 and is supplied directly to the input 11 of the compound gear train 3a, 3b. At the output 20 of the transmission, the power passes through a reduction unit 21 before being directed to the wheels 2.

The first electrical machine 5 transmits power via its output shaft 12 through a reduction unit 13 which is connected, on the one hand, to the sun gear $P_a$ of the first gear train 3a and, on the other hand, to the ring gear $C_7$ of the mode changing gear train 7.

The second electrical machine 6 transmits power via its output shaft 14 through a reduction unit 15 connected directly to the sun gear $P_4$ of the gear train 4. The planet carrier $PS_4$ of this simple gear train 4 is fixed to the sun gear $P_b$ of the gear train 3b. The ring gear of the simple gear train 4 is fixed to the sun gear $P_7$ of the mode changing gear train 7.

The engagement/disengagement unit 8 comprises two dog tooth systems 16, 17. The dog tooth system 16 can immobilize the planet carrier $PS_7$ of the mode changing gear train 7. The dog tooth 17 can immobilize the sun gear $P_7$ of the mode changing gear train 7, thus also immobilizing the ring gear $C_4$ of the gear train 4 to which it is fixed.

Figure 2:
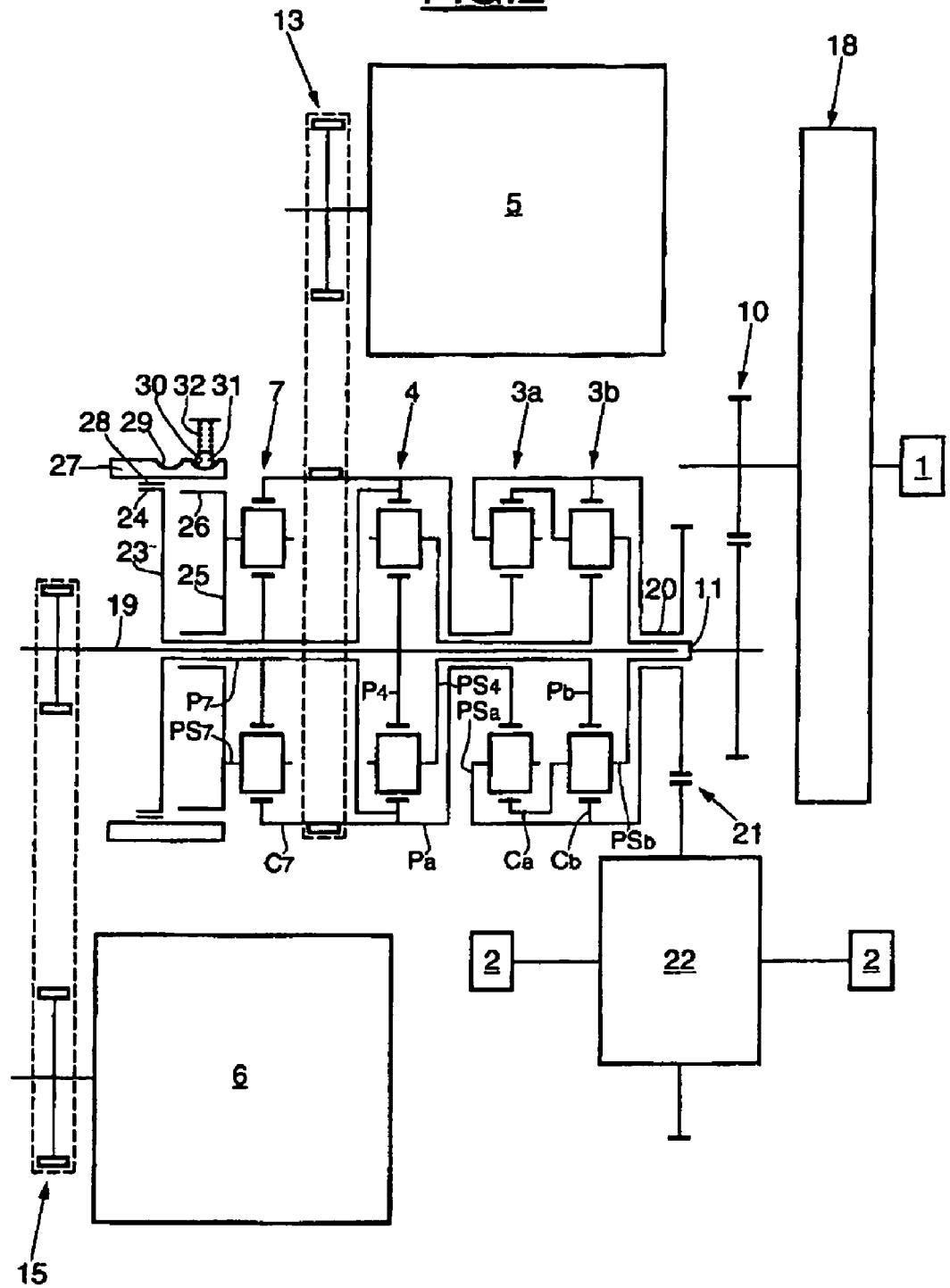
FIG. 2 shows schematically a practical embodiment of this transmission.

In FIG. 2, where identical elements have the same references, the engine 1 is connected, by means of a damper device 18, to a set of reduction gears 10 which transmits the power to the input point 11 which is connected to the planet carrier PSb and also to the ring gear $C_a$. The electrical machine 5 transmits its power via the reduction unit 13 to the sun gear Pa of the epicyclic gear train 3a and to the ring gear $C_7$ of the epicyclic gear train 7 for mode changing.

The electrical machine 6 transmits its power via the reduction unit 15 through the central shaft 19 to the sun gear $P_4$ of the epicyclic gear train 4. Finally, the output 20 of the transmission receives power through the common point between the ring gear $C_b$ of the epicyclic gear train 3b and the planet carrier PSa of the epicyclic gear train 3a. This output is connected by the reduction gears 21 to a differential 22, and then to the vehicle wheels 2.

The sun gear $P_7$ of the mode changing gear train 7 is fixed to an annular member 23 which carries a set of dog teeth 24 on its periphery. Similarly, the planet carrier $PS_7$ of the mode changing gear train 7 is fixed to an annular member 25 which carries a set of dog teeth 26 on its periphery. A sliding sleeve 27 can move axially parallel to the axis of the transmission.

The sliding sleeve 27 has a set of dog teeth 28 and also has cavities 29 and 30 which can interact alternatively with retaining balls 31 subject to the action of springs 32.

Figure 3:
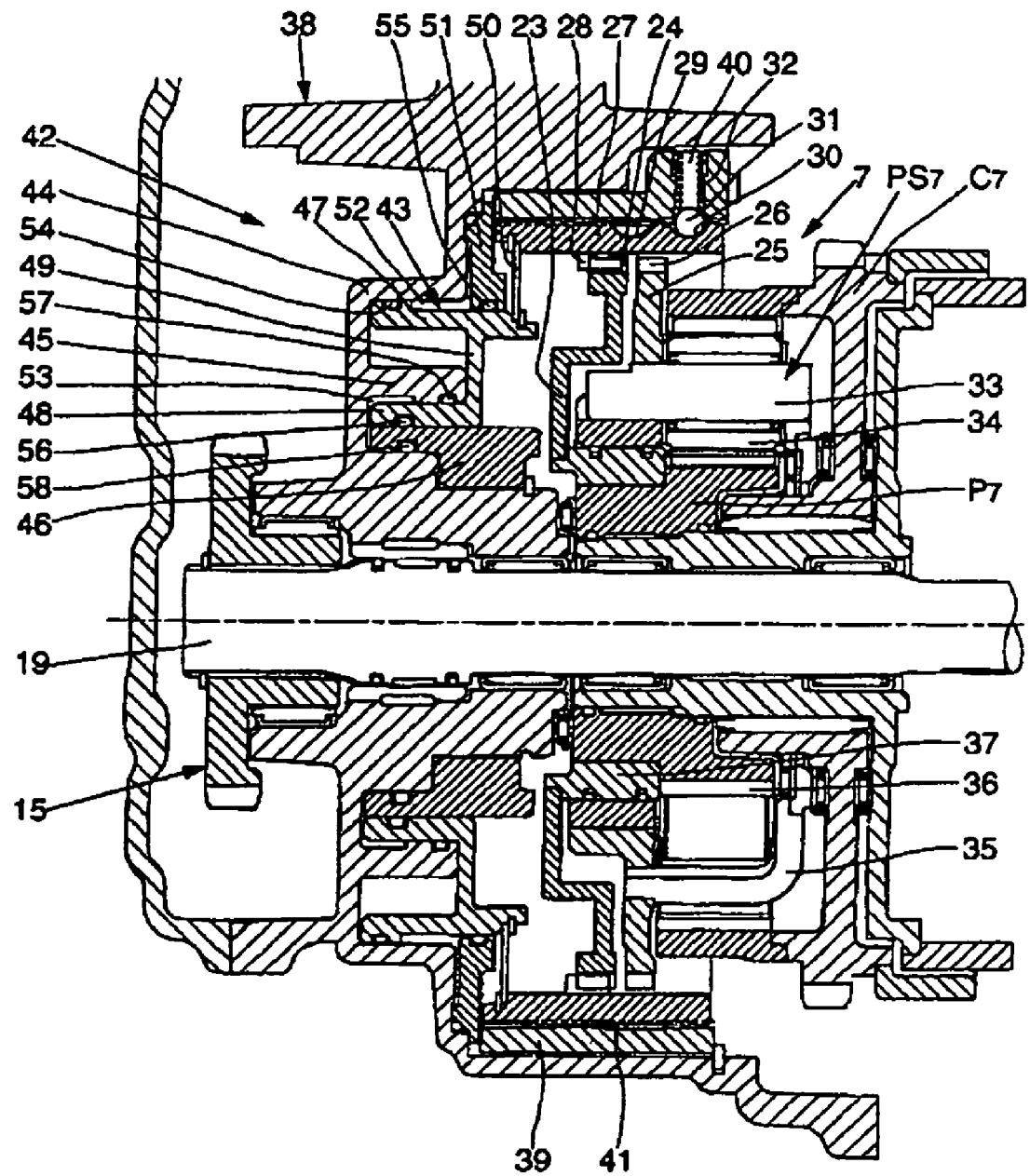
FIG. 3 shows, in partial section, an example of practical embodiment of the mode changing control device.

FIG. 3 shows, by way of example, a possible practical embodiment of this structure.

Similar members are given the same references. FIG. 3, which is a partial section through a transmission, essentially shows the mode changing epicyclic gear train, indicated by 7 in FIG. 2, the other elements of the transmission being omitted to simplify the figure. FIG. 3 shows the planet carrier $PS_7$ of the mode changing gear train 7, of which one shaft 33 and a planet gear 34 are visible. The annular member 25 is fixed to the planet carrier $PS_7$ by a fixing element 35.

FIG. 3 also shows the sun gear $P_7$ of the mode changing gear train 7 whose toothing 36 engages with the planet gears such as the gear 34. The annular member 23 is fixed to the sun gear $P_7$ by means of a fixing ring 37.

The sliding sleeve 27 is movable axially with respect to the fixed frame 38 of the transmission by means of an annular support piece 39 which has one or more housings 40 for springs 32 acting on retaining balls 31, the whole assembly forming a ball-type retaining device. In the section shown in FIG. 3, only one ball 31 is visible. Transverse ribs 41, formed respectively on the outer periphery of the sliding sleeve 27 and inside the bore of the fixing ring 39, enable the sliding sleeve 27 to slide axially and to be fixed with respect to rotation.

The sliding movement of the sliding sleeve 27 is provided by a double-acting hydraulic actuator 42, consisting of a movable piston 43 moving with respect to a set of fixed walls which is fixed to the frame 38 and which acts as a cylinder. These fixed walls comprise, in particular, an outer wall 44 forming a first outer ring gear, an intermediate wall 45 forming a second intermediate ring gear, and an inner wall 46 formed on an intermediate piece fixed to the frame 38. The piston 43 itself has an outer ring gear 47 and an inner ring gear 48, which are interconnected by a radial flange 49. The piston 43 is connected mechanically to the sliding sleeve 27 by a spring washer 50. Finally, the assembly is completed by a radial flange 51 which provides the external guiding of the piston 43.

The piston 43 is moved by a hydraulic pressure which can be exerted in two hydraulic feed chambers 52 and 53. It will be noted that the hydraulic chamber 52 is formed between the annular wall 44 fixed to the frame 38 and the annular ring gear 47 of the piston 43, and is sealed by the piston 43. The hydraulic chamber 53 is formed between the internal bore of the intermediate wall 45 fixed to the frame 38 and the outer cylindrical face of the inner annular ring gear 48 of the piston 43. Thus the two hydraulic operating chambers 52, 53 are formed as a thin annular space between two facing annular walls. The chamber 53, which is radially further inward, can move the piston 43 from the left towards the right of FIG. 3 when the pressure of the hydraulic fluid in the chamber is raised; in other words, it can cause a movement of the sliding sleeve 27 out of the position which it occupies in FIG. 3, against the retaining force exerted by the balls 31. The piston 43 is moved in the opposite direction, in other words from the right to the left of FIG. 3, by feeding pressurized hydraulic fluid into the other feed chamber 52 located radially farther outward.

The feed chambers 52, 53 are sealed, in the illustrated example, by sealing rings indicated by 54 and 55 for the chamber 52, and indicated by 56, 57 and 58 for the chamber 53.

Clearly, the sealing rings can be replaced with overmoulded lip seals or four-lobed seals which, although more expensive, can provide better sealing and less friction.

It will be noted that the piston 43 is mounted in the frame 38 so as to be entirely located on one side of the sliding sleeve 27, which, by comparison with the ordinary operating structures of brakes or hydraulic clutches, considerably simplifies the architecture of the transmission and enables a more compact assembly to be achieved.

The change from one operating mode of the transmission to another is made in a reversible way by a simple change of feed to the chambers 52 and 53 by pressure pipes not shown in the figure.

In the idle state, the dog toothing 28 of the sliding sleeve 27 is engaged with the toothing 24 fixed to the sun gear $P_7$ of the mode changing gear train 7. This position is shown in FIG. 3. When fed to the chamber 53, the pressurized oil exerts an axial thrust on the piston 43 which moves from the left to the right in FIG. 3, and by this movement drives the sliding sleeve 27 against the retaining force of the balls 31. During this change from one operating mode to the other operating mode, the dog toothing 28 of the sliding sleeve 27 passes through a state in which it engages simultaneously with the toothing 24 fixed to the sun gear $P_7$ and with the toothing 26 fixed to the planet carrier $PS_7$. In this state, the two modes are therefore engaged simultaneously, the sun gear $P_7$ and the planet carrier $PS_7$ being simultaneously immobilized with respect to rotation by the sliding sleeve 27.

As the feed to the chamber 53 continues, the piston 43 continues to move and maintains its thrust on the sliding sleeve 27 until the latter occupies the position in which the balls 31 enter the housings 29. In this position, the dog toothing 28 of the sliding sleeve 27 engages exclusively with the toothing 26 which is fixed to the planet carrier $PS_7$, which puts the transmission in its second operating mode.

It will be noted that, in both operating modes, the sliding sleeve 27 is kept in a stable state by the balls 31 which are driven by their springs 32 and are housed alternately in the housings 29 or 30.

Consequently, a failure in the hydraulic feed has no effect on the state of the transmission, which remains in the engaged mode.

Moreover, the efficiency of the power transmission is improved because of the presence of the dog toothing which transmits the power by a mechanical positive coupling and not by friction, as is the case when brakes or hydraulic clutches are used.

The change of mode which is the converse of the above is carried out by feeding the hydraulic chamber 52 which returns the piston 43 to the position shown in FIG. 3.

It will be noted that the arrangement of the piston 43 and the operating chambers 52, 53 is such that the volume of said chambers is as small as possible, in order to minimize the filling volume and consequently the duration of the movement of the sliding sleeve 27 and the clutching time.

The invention claimed is:

1. An infinitely variable transmission with two operating modes for a motor vehicle, comprising:
   a first main power branching path with a compound epicyclic gear train configured to link a combustion engine to wheels of the vehicle;
   a second power branching path with a first simple epicyclic gear train;
   two electrical machines forming a continuous speed controller;

a second simple epicyclic gear train configured to change the operating modes, the second simple epicyclic gear train including a first member and a second member a sliding sleeve including dog toothing configured to be in engagement with the first member while the sliding sleeve is in a first position associated with a first operating mode of the operating modes, and the dog toothing configured to be in engagement with the second member while the sliding sleeve is in a second position associated with a second operating mode of the operating modes; and a hydraulic actuator configured to displace the sliding sleeve from the first position to the second position and from the second position to the first position, wherein the dog toothing of the sliding sleeve is engaged with both the first member and the second member while being displaced between the first position and second position.

2. The transmission as claimed in claim 1, wherein the hydraulic actuator further comprises:
   a piston configured to displace the sliding sleeve from the first position to the second position and from the second position to the first position; and
   two hydraulic feed chambers located one on each side of an active part of the piston.

3. The transmission as claimed in claim 2, wherein the piston is connected to the sliding sleeve by a spring washer.

4. The transmission as claimed in claim 1, wherein the hydraulic actuator including a piston is located axially on one side of the sliding sleeve.

5. The transmission as claimed in claim 1, wherein the dog toothing of the sliding sleeve is in communication with the second epicyclic gear train only at the first member while the sliding sleeve is in the first position, and the dog toothing of the sliding sleeve is in communication with the second epicyclic gear train only at the second member while the sliding sleeve is in the second position.

6. The transmission as claimed in claim 5, wherein the transmission further comprises:
   a retaining device with balls and springs configured to interact with the sliding sleeve to keep the sliding sleeve in position while in the first position or the second position.

7. The transmission as claimed in claim 2, wherein the hydraulic feed chambers are sealed by sealing rings.

8. The transmission as claimed in claim 5, wherein the first member is a dog toothing of a sun gear and the second member is a dog toothing of a planet carrier.

9. The transmission as claimed in claim 1, wherein the hydraulic actuator includes a piston assembly, comprising:
   a cylinder fixed to the stationary transmission walls, the cylinder including an outer annular wall, an intermediate annular wall, and an inner annular wall;
   a piston configured to displace the sliding sleeve from the first position to the second position and from the second position to the first position, the piston includes
      an outer piston ring communicating with the outer annular wall by a first sealing ring,
      an inner piston ring communicating both with the intermediate annular wall by a second sealing ring and with the inner annular wall by a third sealing ring, and
      a radial flange connecting the outer piston ring to the inner piston ring;
   a first thin annular space between the outer annular wall and an outer convex surface of the outer piston ring; and
   a second thin annular space between an inner bore of the intermediate annular wall and an outer convex surface of the inner piston ring.

10. The transmission as claimed in claim 9, wherein the piston is configured to move in a first axial direction by applying a first hydraulic pressure to the first thin annular space, and wherein the piston is configured to move in a second axial direction by applying a second hydraulic pressure to the second thin annular space.

11. An infinitely variable transmission with power branching and two operating modes for a motor vehicle equipped with a combustion engine, comprising:
   a first main power branching path with a compound epicyclic gear train linking the combustion engine to wheels of the vehicle;
   a second power branching path with a first simple epicyclic gear train;
   two electrical machines forming a continuous speed controller; and
   a second simple epicyclic gear train for mode changing, together with an engagement/disengagement unit configured to lock or release a member of the second epicyclic gear train for mode changing, according to the operating mode.
   wherein the engagement/disengagement unit comprises a sliding sleeve including dog toothing that can be displaced by a hydraulic actuator and two sets of do teeth, each fixed to a member of the second epicyclic gear train for mode changing,
   wherein the sliding sleeve can occupy two positions, in each of the two positions the dog toothing of the sliding sleeve engages with only one set of do teeth of a member of the second epicyclic gear train for mode changing, and
   wherein the dog toothing of the sliding sleeve is in engagement with the two sets of dog teeth, each of which is fixed to the members of the mode changing gear train, during a change between the two positions of the sliding sleeve.

* * * * *